United States Patent [19]

Yamada

[11] 3,813,651

[45] May 28, 1974

[54] DATA PROCESSING SYSTEM

[75] Inventor: Hirohide Yamada, Tokyo, Japan

[73] Assignee: Tokyo Shibaura Electric Co., Ltd., Kawasaki-shi, Japan

[22] Filed: Dec. 26, 1972

[21] Appl. No.: 318,690

[30] Foreign Application Priority Data

Dec. 29, 1971 Japan .................................... 46-705
Dec. 29, 1971 Japan .................................... 46-707
Dec. 29, 1971 Japan .................................... 46-2051

[52] U.S. Cl. ............................................ 340/172.5
[51] Int. Cl. ............................................ G06f 9/00
[58] Field of Search .................................. 340/172.5

[56] References Cited

UNITED STATES PATENTS

| | | | |
|---|---|---|---|
| 3,336,582 | 12/1967 | Beausoleil et al. | 340/172.5 |
| 3,480,914 | 11/1969 | Schlaeppi | 340/172.5 |
| 3,633,169 | 1/1972 | Bickford et al. | 340/172.5 |
| 3,710,326 | 1/1973 | Nezu et al. | 340/172.5 |
| 3,716,837 | 2/1973 | Waddell | 340/172.5 |

*Primary Examiner*—Paul J. Henon
*Assistant Examiner*—Michael Sachs
*Attorney, Agent, or Firm*—Flynn & Frishauf

[57] ABSTRACT

A data processing system comprising an assembly of buses for interconnecting a plurality of units, the units including data processing units, a memory unit and peripheral data processing units, the data processing units being connected in series with each other via a signal line and being further connected to said bus assembly in parallel relationship with each other. A bus control unit is provided for delivering a "who" signal (which is used for detecting a requesting unit) to the first one of said serially connected data processing units when said unit requests the use of said bus assembly. Further provided is an interface circuit unit which receives the "who" signal from the signal line and which, when any of the units does not make its own request for the use of the bus assembly upon receipt of the "who" signal, transmits said "who" signal to the immediately following unit and, when the first mentioned unit requests the use of the bus assembly for itself, prevents said "who" signal from being further transmitted, and selects another unit associated with the address signal delivered from said bus requesting unit and interconnects both units through said bus assembly.

8 Claims, 10 Drawing Figures

DATA PROCESSING SYSTEM

BACKGROUND OF THE INVENTION

This invention relates to a data processing system and more particularly to a data processing system designed to transmit data through the same bus assembly from one unit to another such as a logical unit, memory unit and input-output (I/O) unit.

Due to the recent development of a memory element included in a data processing system, for example, an electronic computer, a memory unit as a whole has attained a quicker operation, accelerating the processing of data by such computer. Where, therefore, the computer is applied in the work of, for example, controlling a plant, the operating speed of the computer now scarcely raises a problem as in the past. But elevation of its reliability has come to assume a greater importance.

The prior art electronic computer generally has a memory channel associated with a memory unit and an input-output (I/O) channel related to a logical unit, namely, a central processing unit (hereinafter referred to as "CPU"). This arrangement, however, causes the units associated with said channels to present a lower adaptability for mutual exchange of data. Further, the conventional computer is a type in which undue importance is attached to the memory unit or CPU, namely, a system in which the CPU, together with a control unit, is connected to, for example, a memory unit through one bus and an (I/O) unit is connected to said CPU or control unit through another bus, thus preventing data from being exchanged among various units, unless the data are transmitted through the memory unit or CPU. Moreover, the aforesaid memory channel and I/O channel are fixed in place, presenting difficulties in enlarging the capacity of such system.

The prior art electronic computer is generally provided with a means for processing an interruption signal. Said interruption signal-processing means includes a flip-flop circuit temporarily to store interruptions signals from the various units. Said flip-flop circuit is connected to all the units generating an interruption signal through the corresponding buses. Each time there is generated an interruption signal, the flip-flop circuit is set to indicate that said interruption is required. Where, however, an interruption level or interruption signal varies, the above-mentioned arrangement makes it necessary to change the connection between the related units, presenting great inconvenience. Therefore, the prior art data processing system has the drawback that it has a lower adaptability to cope with variation of data.

SUMMARY OF THE INVENTION

It is accordingly an object of this invention to provide a data processing system wherein the CPU and memory unit are connected to a bus assembly in parallel relationship with each other, like other units, thereby enabling the system to have its capacity easily increased.

Another object of the invention is to provide a data processing system which permits a quick exchange of data between a unit requesting the use of a bus assembly and a responding unit with the same bus. Namely, where one of the units, for example, the CPU requires data to be supplied from a core memory, then the CPU generates a signal requesting the use of a bus assembly and supplies the core memory with a signal specifying the address from which data is to be read out and immediately receive the required data from said memory through the bus assembly, thereby attaining a very smooth transmission of data.

Still another object of the invention is to provide a data processing system capable of effecting an interruption operation without fail and far more adapted to cope with variation of data.

DESCRIPTION OF THE PREFERRED EMBODIMENTS

Figure 1:
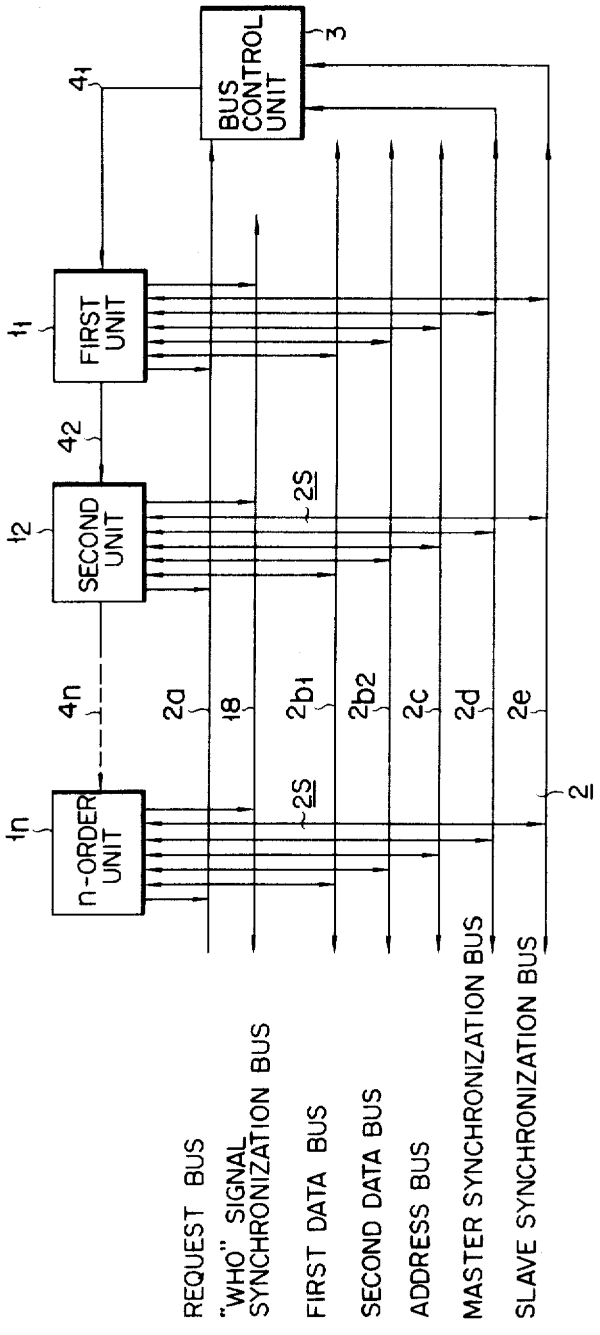
FIG. 1 is a block circuit diagram of a data processing system according to an embodiment of this invention.

There will now be described by reference to FIG. 1 the arrangement of the entire data processing system according to an embodiment of this invention. Reference numerals $1_1$ to $1_n$ denote the first to the n-order units for storing and processing data such as a CPU, memory unit and input-output I/O unit. The units $1_1$ to $1_n$ are connected in parallel relationship with each other by signal lines 2S to a bus assembly 2 including a request bus 2*a*, "who" signal synchronization bus 18, first and second data buses $2b_1$ and $2b_2$, address bus 2*c*, master synchronization bus 2*d*, and slave synchronization bus 2*e*. The request bus 2*a*, master synchronization bus 2*d* and slave synchronization bus 2*e* of said bus assembly 2 are connected to a bus control unit 3. The indicated arrows attached to the buses and signal lines show the directionality of said buses and lines. Where any of the units $1_1$ to $1_n$ gives forth a signal requesting the use of a bus, then "who" signals from the bus control unit 3 are successively transmitted through signal lines $4_1$ to $4_n$ which are successively connected to a series of units starting from the bus control unit 3.

There will now be roughly described with reference to the chart of FIGS. 2A to 2E the operation of the units $1_1$ to $1_n$, whose arrangement will be later detailed. Under normal condition, namely, where any transmission of data does not take place, the buses 2*a* to 2*e* signal lines 2S and signal lines $4_1$ to $4_n$ maintain a state of "1," namely, a state of positive potential. Where any of the units $1_1$ to $1_n$ gives forth a bus-requesting signal indicated by FIG. 2B, then the request bus 2*a* is brought to a state of "0," namely, a state of zero potential. Accordingly, the bus assembly 2 as a whole is rendered operative as shown by FIG. 2A. Where the request bus 2a presents a zero potential, the bus control unit 3 detects said condition and sends, as shown in FIG. 2C, a "who" signal to the first unit $1_1$ through a signal line $4_1$, causing said signal line $4_1$ to be changed from a positive to a zero potential. If the first unit $1_1$ itself does not send forth a bus-requesting signal when supplied with said "who" signal, then said "who" signal is transmitted to the second unit $1_2$ through a signal line $4_2$, reducing said line to a zero potential. Contrary where the first unit $1_1$ has already issued a bus-requesting signal when supplied with the aforesaid "who" signal, the first unit $1_1$ prevents the "who" signal from being transmitted to the immediately following unit $1_2$. In this case, the first unit $1_1$ itself acts as a master unit. If said unit $1_1$ has data requiring transmission, it delivers said data to the first data bus $2b_1$ and the address of another unit being supplied with said data to the address bus 2*c* and a master synchronization signal shown in FIG. 2D as a timing signal to the master synchronization bus 2d to reduce its potential to zero. When the master synchronization bus 2*d* has its potential reduced to zero, then the remaining units $1_2$ to $1_n$ determine whether the address now brought to the address bus 2c synchronizes with their own addresses. That of the remaining units $1_2$ to $1_n$ whose address agrees with the address on the address bus 2*c* receives the data delivered to the first data bus $2b_1$ from the aforesaid master unit (in the first unit $1_1$). If, in this case, the responding unit has any data which should be sent back to the master unit, then the responding unit delivers said data to the second data bus $2b_2$ and thereafter supplies a slave synchronization signal shown in FIG. 2E to the slave synchronization bus 2*e* to reduce its potential to zero. When supplied with said slave synchronization signal, the master unit receives the data delivered to the second data bus $2b_2$ from said responding unit, shuts off a bus-requesting signal to bring the master synchronization bus 2*d* back to a state of positive potential, and stops supplying an output signal to the first data bus $2b_1$ and address bus 2*c*. This condition is detected by the bus control unit 3 through the master synchronization bus 2*d* to change the "who" signal line $4_1$ to positive potential and shut off the "who" signal. A unit, for example, the second unit $1_2$ which has acted as a slave unit ceases to generate a slave-synchronization signal when it is detected that the "who" signal synchronization bus 18 has been restored to positive potential, thus bringing the operation of the bus control unit 3 to an end. When the request bus 2 of FIG. 1 is thus freed from an operating condition shown by FIG. 2A and the bus control unit 3 completes its action, then the bus assembly 2 as a whole is rendered inoperative ready for the succeeding request for its use. The operation period of the system shown by the dashed lines in FIGS. 2A to 2E is not given by only the operation of bus assembly 2, because the internal timing of each unit is related to the operation period.

There will now be detailed the construction of the units $1_1$ to $1_n$ and the bus control unit 3. Description is first given of the units $1_1$ to $1_n$. Each unit includes a bus interface circuit of FIG. 3 disposed on the master unit side and a bus interface circuit of FIG. 4 provided on the slave unit side. However, the units which can not act as a master unit, such as a main memory unit and interruption unit do not need the bus interface circuit of FIG. 3. Similarly, the units which can not act as a slave unit, such as the CPU, do not require the bus interface circuit of FIG. 4.

Figure 3:
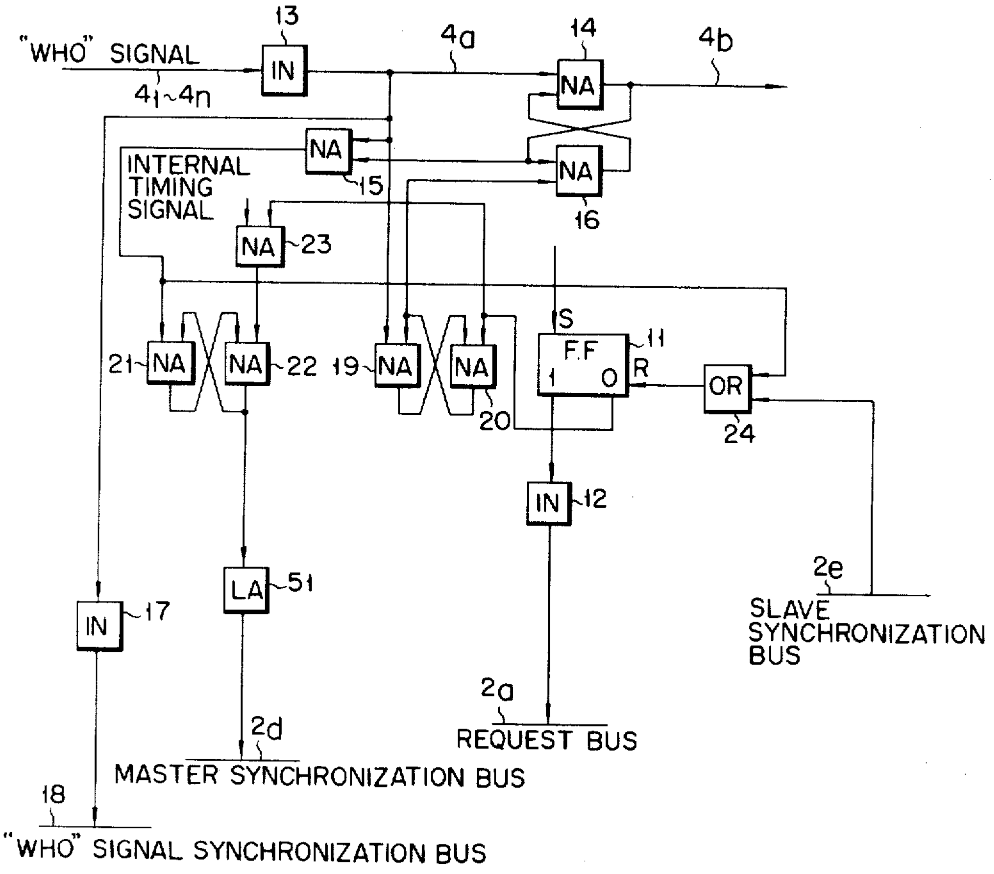
FIG. 3 is a circuit diagram showing the details, particularly the interface circuit of a bus requesting unit, namely, a master unit.
Figure 4:
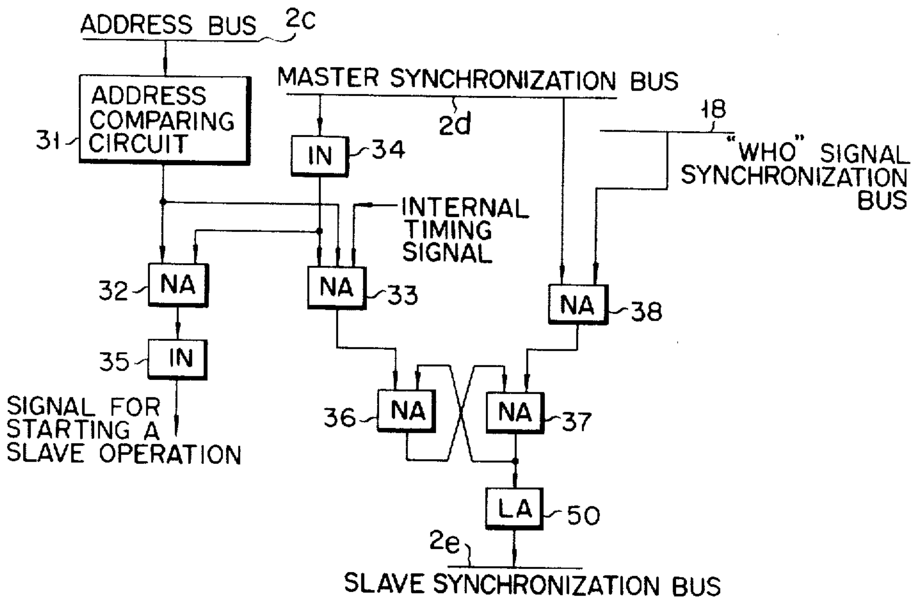
FIG. 4 is a circuit diagram showing the details, particularly the interface circuitry of a responding unit, namely, a slave unit.

Referring to FIG. 3, referential numeral 11 denotes a flip-flop circuit for causing a unit capable of acting as a master unit to generate a bus-requesting signal. The set terminal of said flip-flop circuit 11 is supplied with a bus-requesting signal of the aforesaid master unit and the output terminal thereof on the "1" side is connected to the request bus 2a through an inverter 12. The signal lines $4_1$ to $4_n$ connected to the bus control unit 3 or the preceding units $1_1$ to $1_n$ are connected to one of the input terminals of a NAND gate 14 through an inverter 13 and a signal line 4*a*. The NAND gate 14 allows or obstructs the passage of a "who" signal delivered from any of the preceding signal lines $4_1$ to $4_n$ according to the state of operation of the units $1_1$ to $1_n$. An output signal from the NAND gate 14 is conducted through a signal line 4*b* to the succeeding unit. The output terminal of the NAND gate 14 is connected to one of the input terminals of the other NAND gates 15 and 16 respectively and the output terminal of the NAND gate 16 is connected to the other input terminal of the NAND gate 14.

The signal line 4*a* is connected through an inverter 17 to a "who" signal synchronization bus 18, and also connected to the other input terminal of the NAND gate 15 and one of the input terminals of a NAND gate 19, the output terminal of which is connected to one of the input terminals of a NAND gate 20. The other input terminal of the NAND gate 20 is connected to the output terminal of the flip-flop circuit 11 on the "0" side, and the output terminal of said NAND gate 20 is connected to the other input terminal of the NAND gates 16 and 19 respectively. The output terminal of the NAND gate 15 is connected to one of the input terminals of a NAND gate 21, the output terminal of which is connected to one of the input terminals of a NAND gate 22. The other input terminal of said NAND gate 22 is connected to the output terminal of a NAND gate 23. The output terminal of the NAND gate 22 is connected to one of the input terminals of the NAND gate 21 and the input terminal of a buffer amplifier 51. The output terminal of the buffer amplifier 51 is connected to the master synchronization bus 2d. The NAND gate 23 has one of its input terminals supplied with an internal timing signal and the other input terminal connected to the output terminal of the flip-flop circuit on the "0" side. The term "internal timing signal," as used herein, is defined to mean a timing signal generated characteristically of the units $1_1$ to $1_n$. Said internal timing signal denotes "0" while the bus assembly 2 is used, namely, while the system is in operation, and sets the flip-flop circuit 11, and, upon completion of said operation, is turned to "1." The output terminal of the NAND gate 15 and slave synchronization bus 2*e* are connected through the OR gate 24 to the reset terminal of the flip-flop circuit 11.

There will now be described by reference to FIG. 4 the bus interface circuit facing a slave unit. A unit capable of acting as a slave unit compares its own address with the one received through the address bus 2*c*. An address comparing circuit 31 which generates an output signal at the synchronization of both addresses is connected to the address bus 2*c*. The output terminal of the address comparing circuit 31 is connected to one of the input terminals of a NAND gate 32 and the second input terminal of a NAND gate 33. The other input terminal of the NAND gate 32 and the first input terminal of the NAND gate 33 are connected to the master synchronization bus 2d through an inverter 34. An output from the NAND gate 32 is delivered through an inverter 35 as a signal for starting the operation of a slave unit. The third input terminal of the NAND gate 33 is supplied with an internal timing signal of the slave unit to control the operation of said gate 33. The internal timing signal represents "0" while the slave unit is in operation, and "1" while said unit is out of operation.

The output terminal of the NAND gate 33 is connected to one of the input terminals of a NAND gate 36, the output terminal of which is connected to one of the input terminals of the NAND gate 37. The output terminal of the NAND gate 37 is connected to the other input terminal of the NAND gate 36 and the input terminal of a buffer amplifier 50. The output terminal of the buffer amplifier 50 is connected to the slave synchronization bus 2e. The other input terminal of the NAND gate 37 is connected to the output terminal of a NAND gate 38, the two input terminals of which are connected to the master synchronization bus 2d and "who" signal bus 18 respectively.

Figure 5:
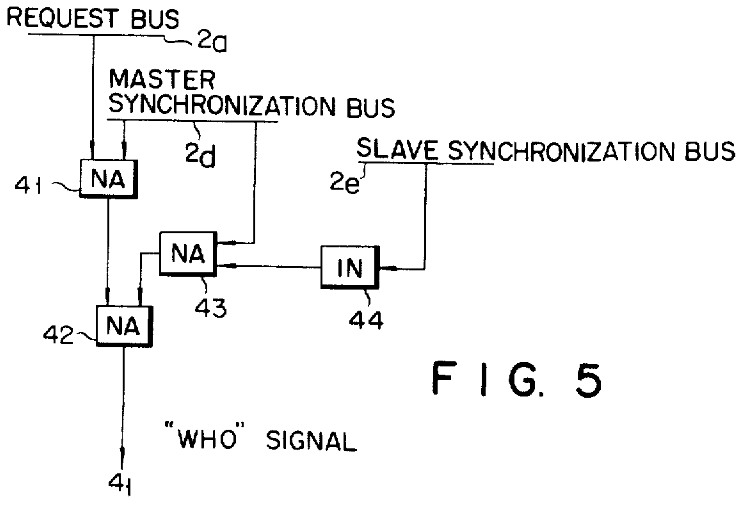
FIG. 5 presents the detailed circuit arrangement of a bus control unit.

Referring to FIG. 5, the bus control unit 3 has the two input terminals of a NAND gate 41 connected to the request bus 2a and master synchronization bus 2d respectively. The output terminal of the NAND gate 41 is connected to one of the input terminals of a NAND gate 42. An output signal from the NAND gate 42 which is used as a "who" signal is conducted through the signal line $4_1$ to the first unit $1_1$. The other input terminal of the NAND gate 42 is connected to the output terminal of a NAND gate 43. One of the input terminals of the NAND gate 43 is connected to the master synchronization bus 2d and the other input terminal is connected to the slave synchronization bus 2e through an inverter 44.

There will now be described the operation of the entire data processing system of this embodiment arranged as described above. Where no exchange of data takes plate, the buses 2a to 2e are kept in positive potential. Namely, where any of the units $1_1$ to $1_n$ does not request the use of the bus assembly 2, then the flip-flop circuit 11 of a master unit is in a reset condition. A "0" signal delivered from the output terminal of said flip-flop circuit 11 on the "1" side is inverted to a "1" signal through the inverter 12 and supplied to the request bus 2a to keep it in a state of "1," namely, a state of positive potential. The "who" signal lines $4_1$ to $4_n$ are also normally in a state of "1," namely, a state of positive potential. The "1" signal is inverted to a "0" signal through the inverter 13 and supplied to the input terminal of the NAND gate 14 through the signal line 4a. Accordingly, the signal line 4b through which there is transmitted a "who" signal to the succeeding unit is kept in a state of "1," namely, a state of positive potential. While the flip-flop circuit 11 is reset, the internal timing signal denotes "1" and the output terminal of the flip-flop circuit 11 on the "0" side generates an output signal of "1." Therefore, the NAND gate 23 produces an output signal of "0." Accordingly, a "1" signal from the NAND gate 22 is supplied to the master synchronization bus 2d to keep it in a state of positive potential. While the signal line 4a is in a state of "0," the inverter 17 produces a signal of "1" and the "who" signal synchronization bus 18 is in a state of "1," namely, a state of positive potential.

Where any of the units $1_1$ to $1_n$ requests the use of the bus assembly 2, said unit gives forth a signal requesting the use of the bus assembly 2, causing the flip-flop circuit 11 to be supplied with a set signal. When said circuit 11 is set, a "1" signal is delivered from its output terminal on the "1" side. Then the inverter 12 produces an output signal of "0" to bring the request bus 2a to a state of "0," thereby notifying the bus control unit 3 that the use of the bus assembly 2 is now requested. When the request bus 2a has a potential of "0," the bus control unit of FIG. 5 causes the NAND gate 41 to produce an output signal of "1." At this time, the slave synchronization bus 2e has a potential of "1," and the inverter 44 generates an output signal of "0." As the result, the NAND gate 43 produces an output signal of "1" and in consequence the NAND gate 42 gives further an output signal of "0," which is conducted to the first unit $1_1$ as a "who" signal through the signal line $4_1$.

Upon generation of the "who" signal, the signal line $4_1$ of FIG. 3 has a potential of "0," causing the inverter 13 to produce an output signal of "1." If, under this condition, the first unit $1_1$ has no request to use the bus assembly 2, namely, the flip-flop circuit 11 is not set, then the output terminal of said circuit 11 on the "0" side produces an output signal of "1" and the NAND gate 19 also generates an output signal of "1." Accordingly, the NAND gate 20 gives forth an output signal of "0," so that the input terminal of the NAND gate 14 is supplied with a "1" signal through the NAND gate 16. When the NAND gate 14 is thus supplied with an input, the signal line 4b has a potential of "0," allowing the aforesaid "who" signal to be transmitted to the succeeding unit $1_2$.

If, however, the first unit $1_1$ requests the use of the bus assembly 2, namely, the flip-flop circuit 11 is set, then its output terminal on the "0" side gives forth an output signal of "0," causing the NAND gate 20 to produce an output signal of "1." On the other hand, the NAND gate 14 initially produced an output signal of "1" and consequently the NAND gate 16 an output signal of "0." Accordingly, the signal line 4b is kept in a potential of "1," preventing the "who" signal supplied to the signal line 4a from being further transmitted to the following unit $1_2$.

While the flip-flop circuit 11 is set, both signal lines 4a and 4b have a potential of "1." Therefore, the NAND gate 15 produces an output of "0," and the NAND gate 21 an output of "1." At this time, the flip-flop circuit 11 generates an output signal of "0" from its output terminal on the "0" side. Accordingly, the NAND gate 23 produces an output signal of "1" and NAND gate 22 an output of "0." The buffer amplifier 51 gives forth an output signal of "0" which is supplied to the master synchronization bus 2d. When the master synchronization bus 2d has a potential of "0," this condition is detected by a detector (not shown) and the master unit supplies the address bus 2c with the address of a responsible unit. As the result, the first data bus $2b_1$ is supplied with the data being transmitted. Where, however, the responding unit has its function determined simply by designation of its address, such transmission of data may be omitted. Where the signal line 4a has a state of "1" potential, the inverter 17 produces an output signal of "0" to supply a "0" signal to the "who" signal synchronization bus 18.

When the master synchronization bus 2d has a potential of "0," then the inverter 34 of the slave unit or responding unit shown in FIG. 4 generates an output signal of "1." The address comparing circuit 31 always compares its own address with one supplied from the master unit to the address bus 2*c*, and gives forth an output signal of "1" where both addresses synchronize with each other. When a signal of "1" is delivered from the address comparing circuit 31, the NAND gate 32 produces an output signal of "0," and the inverter 35 an output of "1," thereby supplying a start signal to the slave unit. As the result, the slave unit commences to receive the data delivered from the master unit to the first data bus $2b_1$. Where said slave unit has any data to be sent back to the master unit, said data is supplied to the second data bus $2b_2$. When the slave data completes its operation, the internal timing signal previously supplied to the third input terminal of the NAND gate 33 is changed from "0" to "1." Thus, the NAND gate 33 generates an output signal of "0," and the NAND gate 36 an output signal of "1." Since at this time, the master synchronization bus 2*d* has a potential of "0," the NAND gate 38 gives forth an output signal of "1," and the NAND gate 37 an output signal of "0," supplying the slave synchronization bus 2*e* with a slave synchronization signal.

When supplied with said slave synchronization signal, the NAND gate 15 of the master unit of FIG. 3 produces an output signal of "0," and the slave synchronization bus 2*e* has a potential of "0." Accordingly, the OR gate 24 gives forth an output signal of "0" to reset the flip-flop circuit 11. When reset, said circuit 11 generates an output signal of "1" from its output terminal on the "0" side, causing one of the input terminals of the NAND gate 23 to be supplied with a "1" signal. At this time, the internal timing signal still remains to be "0" and the NAND gate 23 produces an output signal of "1." When the master unit completes its operation including the receipt of the data delivered from the slave unit to the second data bus $2b_2$, then the internal timing signal is changed to "1," the NAND gate 23 generates an output signal of "0" and the NAND gate 22 an output signal of "1." Therefore, the master synchronization signal supplied to the master synchronization bus 2*d* which has now been changed to "1" is prevented from being further transmitted to any other part of the data processing system.

At this time, in the bus control unit 3 of FIG. 5, the master synchronization bus 2*d* has a potential of "1" and the slave synchronization bus 2*e* a potential of "0" and the inverter 44 produces an output signal of "1." Accordingly, the NAND gate 43 gives forth an output signal of "0" and the NAND gate 42 an output signal of "1" to prevent the "who" signal from being further transmitted. The shut off of the "who" signal means that said "who" signal ceases to be supplied to any of the units $1_1$ to $1_n$ through the inverter 13 and NAND gate 14 of FIG. 3. At this time, the "who" signal synchronization bus 18 has a potential of "1." Accordingly, the NAND gate 38 of FIG. 4 generates an output signal of "0," because the master synchronization bus 2d has a potential of "1," thereby preventing the generation of a slave syncrhonization signal. When said slave synchronization signal ceases to be produced, the inverter 44 of FIG. 5 gives forth an output signal of "0" and the NAND gate 43 an output signal of "1" and the "who" signal remains to be "1," thus rendering the data processing system ready to meet the succeeding request for the use of the bus assembly 2.

There will now be described a data processing system according to another embodiment of this invention, which is additionally provided with an interruption unit, wherein the transmission of an interruption signal delivered from any of the units is effected by the same bus assembly.

Figures 2A, 2B, 2C, 2D, 2E:
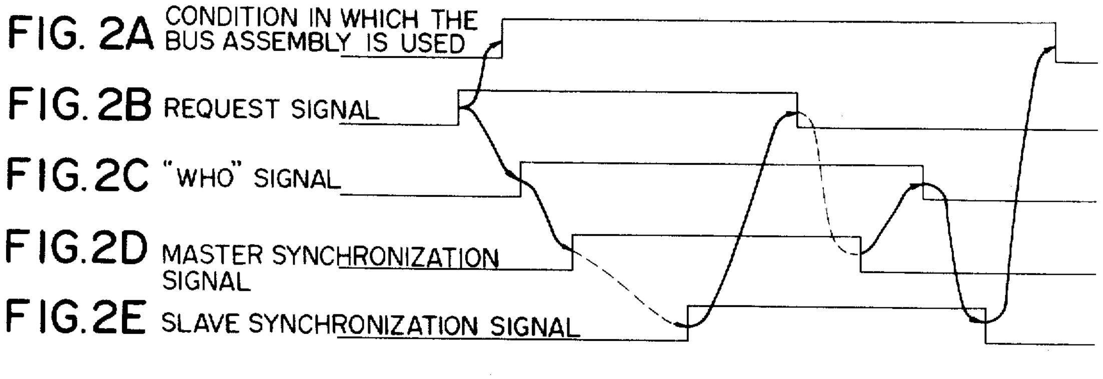
FIGS. 2A to 2E show an operation chart showing the sequential steps of operation of the system of FIG. 1.
Figure 6:
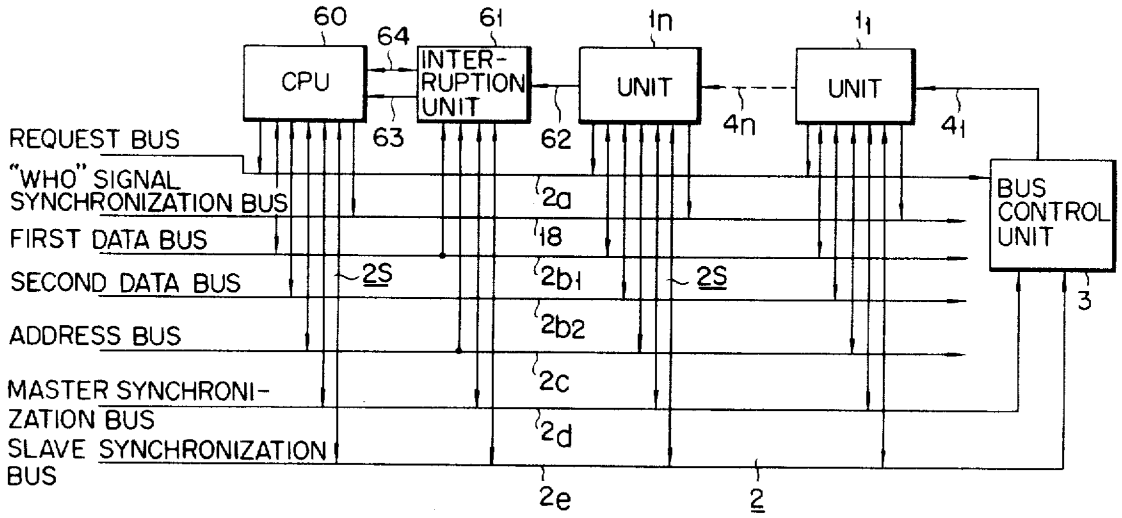
FIG. 6 is a block circuit diagram of a data processing system according to another embodiment of the invention.

Referring to FIG. 6, the buses, signal lines, and units are denoted by the same referential numerals as used in FIG. 1, except for the CPU 60 and interruption unit 61. FIG. 6 shows the CPU 60 singled out from unit $1_1$ to $1_n$ of FIG. 1 to be shown and the CPU 60 and interruption unit 61 are connected to the buses 2*a* to 2*e* in parallel relationship with the units $1_1$ to $1_n$ as in FIG. 1. However, the interruption unit 61 which does not act as a master unit is not connected to the request bus 2a. Further, the unit $1_n$ is connected to the interruption unit 61 by a "who" signal line 62 and the interruption unit 61 is connected to the CPU 60 by a "who" signal line 63. Further, the interruption unit 61 is connected, as later described, to the CPU 60 by a separate signal line 64 and temporarily stores an interruption-requesting signal delivered from any of the units $1_1$ to $1_n$. The stored interruption signal is read out to the CPU 60 through the signal line 64 in exact timing with the CPU 60 so as to effect the operation of interruption. The internal structure and interconnection of the above-mentioned units 60, 61 and 64 are known in the art. For example, U.S. Pat. No. 3,614,741, dated Oct. 19, 1971 shows a processing unit 22 including an interruption priority unit 38 in FIG. 2. As the processing unit 22 has a bus interfacing unit 32, use of the unit 22 as the units 60, 61 and 64 of this embodiment is readily apparent.

Figure 7:
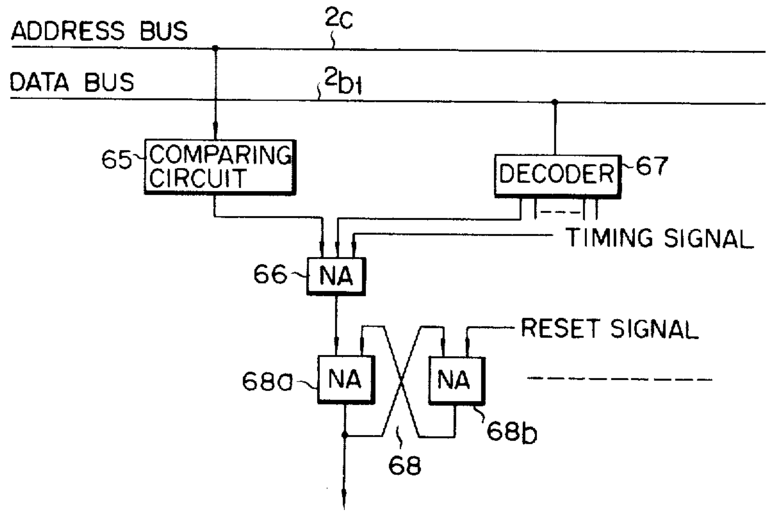
FIG. 7 indicates the detailed circuit arrangement of an interruption unit.

FIG. 7 shows the details of the interruption unit 61, particularly, the memory section. This interruption unit 61 has the same arrangement as in FIG. 4 (though not shown) regarding the processing of a "who" signal. The address bus 2*c* is connected to the input terminal of an address comparing (or decoding) circuit 65, the output terminal of which is connected to the first input terminal of a NAND gate 66. The data buses $2b_1$ and $2b_2$ are connected to the input terminal of a decoder 67, the output terminal of which is connected to the second input terminal of the NAND gate 66. The third input terminal of said NAND gate 66 is supplied with an internal synchronizing or timing signal. The output terminal of said NAND gate 66 is connected to the first input terminal of one NAND gate 68*a* constituting a component of a flip-flop circuit 68 for storing an interruption signal. The output terminal of said one NAND gate 68*a* is connected to a signal line 64*a* and to the first input terminal of the other NAND gate 68*b* constituting another component of the flip-flop circuit 68. The output terminal of said other NAND gate 68 *b* is connected to the second input terminal of the NAND gate 68*a*. The second input terminal of the NAND gate 68*b* is supplied from the CPU 60 via a signal line 64*b* with a reset signal as an interruption-requesting signal. The signal lines 64*a* and 64*b* constitute the signal line 64 of FIG. 6. A circuit comprised of the NAND gate 66 and flip-flop circuit 68 is provided for the respective output terminals of the decoder 67. Accordingly, only that of the flip-flop circuits is set which corresponds to a signal denoting the desired interruption level brought through the data bus $2b_1$. When said particular flip-flop circuit 68 is set, the CPU 60 carries out the processing of data to meet a request for interruption.

There will now be described the operation of the units $1_1$ to $1_n$ associated with interruption. Where interruption is requested, any of the units $1_l$ to $1_n$ makes a request for the use of the bus assembly 2 as in the preceding embodiment. When the bus control unit 3 delivers a "who" signal, the bus assembly 2 is made available for use. Thus the address bus $2c$ is supplied with the address of the interruption unit 61 and the data bus $2b_l$ with a signal denoting the desired interruption level. The interface circuit of the unit 61 always has its own address compared with the one delivered from the address bus $2c$ by the address comparing or decoding circuit 65. The address of interruption unit 61 is pre-set in circuit 65 in the form of a code. When both addresses synchronize with each other (i.e., are the same), said comparing or decoding circuit 65 produces an output signal of "1". At this time, the decoder 67 decodes a signal denoting the desired interruption level delivered from the data bus $2b_l$ and produces an output signal of "1" from one of its output terminals which corresponds to said interruption level signal. Said output signal of "1" is conducted to the second input terminal of the NAND gate 66. As the result, said NAND gate 66 has its first and second input terminals supplied with a signal of "1", and the third input terminal with the internal synchronizing signal. Then the NAND gate 66 generates an output signal of "0" to set the flip-flop circuit 58. Namely, an interruption level signal delivered from any of the units $1_l$ to $1_n$ is stored in that of the flip-flop circuit 68 which corresponds to said interruption level. After stored with said interruption level, the interruption unit 61 restores the potential of the slave synchronization bus 1e to "1" and temporarily stops the use of the bus assembly 2. Later, the interruption unit 61 effects interruption through the signal line 64 in exact timing with the CPU 60. Upon completion of said interruption, the CPU 60 supplies a signal to the NAND gate 68b of the flip-flop circuit 68 to reset it, thus rendering the data processing system ready for the succeeding request for interruption.

According to the system of this invention, a signal requesting interruption delivered from any of the units $1_l$ to $1_n$ is transmitted to the required section of the system through the same assembly 2, eliminating the necessity of providing separate interruption signal lines and rendering the whole system very simple in arrangement. Since the interruption signal is always transmitted through the bus assembly 2, there is no need to change an interruption signal circuit when a data processing system has its capacity increased. Namely, this invention makes such system far more adaptable for any change of data than has been possible with the prior art. Further, the CPU 60 and interruption unit 61 and the other units $1_l$ to $1_n$ are all connected to the bus assembly in parallel relationship. Accordingly, the CPU 60 and interruption unit 61 can each be provided as a separate unit like the other units $1_l$ to $1_n$, enabling the data processing system easily to increase its capacity.

In the foregoing two embodiments, there are provided two data buses so as to transmit data from a master unit and data from a slave unit separately, thereby permitting exchange of data between these units. Obviously, however, exchange of data can be effected all the same, using a single data bus by time sharing.

What is claimed is:

1. A data processing system comprising:

a plurality of data processing units including an arithmetic operation unit, a memory unit and peripheral data processing units, said data processing units being connected in series with each other by means of a signal line;

a main bus assembly including a request bus, a master synchronization bus, a slave synchronization bus, and a data bus for connecting said data processing units in parallel so as to effect exchange of data therebetween;

a main bus control unit for delivering a "who" signal to the first unit of said serially connected data processing units upon receipt of a request signal via said request bus, said "who" signal being used for detecting a unit which has requested the use of buses, said main bus control unit having a first NAND gate including a first input terminal connected to said request bus and a second input terminal connected to said master synchronization bus, a second NAND gate including an input terminal connected to said slave synchronization bus, a third NAND gate icluding a first input terminal connected to said master synchronization bus and a second input terminal connected to the output terminal of said second NAND gate, and a fourth NAND gate including a first input terminal connected to the output terminal of said first NAND gate, a second input terminal connected to the output terminal of said third NAND gate and a "who" signal output terminal connected to the input terminal of said first unit; and a plurality of first interface circuits each of which is associated with said respective data processing units, said interface circuits being connected to receive said "who" signal via said signal line which transmits the "who" signal to the immediately following data processing unit when a data processing unit receiving the "who" signal does not generate a request signal to said request bus for the use of said main bus assembly, and includes means to prevent the "who" signal from being further transferred to the immediately following data processing unit when a data processing unit receiving "who" signal has already generated a request signal to said request bus, and means to select a called data processing unit associated with the address signal given forth by the request signal generated data processing unit so as to connect the desired two data processing units through the main bus assembly.

2. The data processing system according to claim 1 wherein the bus assembly includes a request bus for interconnecting the bus control unit and all of the units with a bus requesting signal delivered from any of the units; a "who" signal synchronization bus through which, a "who" signal synchronization signal is sent to the bus control unit from a bus-requesting unit after the receipt of said "who" signal; a data bus through which exchange of data takes place between the units; an address bus for conducting the address signal delivered from the bus-requesting unit to the selected responding unit associated with said address; a master synchronization bus for transmitting a master synchronization signal to the selected responding unit and bus control unit; and a slave synchronization unit for conducting a slave synchronization signal indicating completion of the receipt and delivery of data by the selected responding unit to the bus-requesting unit and bus control unit.

3. The data processing system according to claim 1 wherein the bus control unit is provided with a first gating circuit for giving forth a "who" signal upon receipt of a bus-requesting signal from any of the units and for stopping the generation of said "who" signal after completion of exchange of data between the bus-requesting unit and a selected responding unit.

4. The data processing system according to claim 1 wherein: said first interface circuit is provided in those of the units which output a bus requesting signal and includes means for transmitting the "who" signal to the immediately following unit when any of the units does not output the requesting signal for the use of the bus assembly, means for preventing said "who" signal from being supplied to said immediately following unit when the first mentioned unit requests the use of the bus assembly for itself, and means for supplying the data delivered from the bus-requesting unit to the data bus; and a second interface circuit is disposed in those of the units responsive to the data delivered from the bus-requesting unit so as to make a response to said data and to connect the bus-requesting unit and selected responding unit through the bus assembly.

5. The data processing system according to claim 4 wherein a first interface circuit is associated with each of the units, and a first interface circuit includes a flip-flop circuit which is set upon receipt of a bus-requesting signal of its own unit to supply said bus-requesting signal to the request bus; a second gating circuit which, when the flip-flop circuit is reset upon receipt of the "who" signal, passes said "who" signal to the immediately following unit and, when the flip-flop circuit is set, prevents said "who" signal from being conducted to said immediately following unit; a third gating circuit which, when the flip-flop circuit receives said "who" signal in a set state, generates a master synchronization signal which is synchronized with an internal timing signal associated with the bus-requesting unit; a circuit for generating a "who" signal synchronization signal synchronized with the "who" signal in connection with the bus-requesting unit when supplied with said "who" signal; and a fourth gating circuit responsive to the completion of operation of the selected responding unit for resetting the flip-flop circuit upon receipt of a slave synchronization signal after completion of the operation of the selected responding unit, which operation is determined by the data delivered from the bus-requesting unit.

6. The data processing system according to claim 4 wherein the second interface circuit includes a comparing circuit for comparing its own address with the one delivered from the bus-requesting unit through the address bus; a fifth gating circuit for generating a signal to actuate said selected responding unit when the comparing circuit produces an output signal and the master synchronization bus is supplied with a master synchronization signal from the first interface circuit; and a sixth gating circuit for generating a slave synchronization signal after said comparing circuit generates an output indicating the completion of the operation of said selected responding unit.

7. The data processing system according to claim 1 wherein there is further provided an interruption unit which is connected to the bus assembly in parallel relationship with the other units temporarily to store an interruption-requesting signal delivered from the bus-requesting unit.

8. The data processing system according to claim 7 wherein the interruption unit includes a comparing circuit for comparing its own address and the one delivered from the bus-requesting unit, and which when both addresses synchronize with each other, generates a signal; a decoder for decoding a signal indicating the desired signal level representing the content of interruption delivered from the bus-requesting unit through the data bus; and a plurality of memory devices for storing said desired signal level representing the content of interruption upon the simultaneous arrival of outputs of said comparing circuit and decoder.

* * * * *

UNITED STATES PATENT OFFICE
CERTIFICATE OF CORRECTION

Patent No. 3,813,651 Dated May 28, 1974

Inventor(s) Hirohide YAMADA

It is certified that error appears in the above-identified patent and that said Letters Patent are hereby corrected as shown below:

On initial page of patent, under the heading of Foreign Application Priority Data, change Japanese Application Nos. "46-705","46-707" and "46-2051" to --47-705--; --47-707--; and --47-2051--; respectively.

Signed and sealed this 8th day of October 1974.

(SEAL)
Attest:

McCOY M. GIBSON JR.
Attesting Officer

C. MARSHALL DANN
Commissioner of Patents